(12) United States Patent
Ikeda

(10) Patent No.: US 8,806,878 B2
(45) Date of Patent: Aug. 19, 2014

(54) VEHICLE AIR CONDITIONER

(75) Inventor: Shintaro Ikeda, Kai (JP)

(73) Assignee: Keihin Corporation (JP)

( * ) Notice: Subject to any disclaimer, the term of this patent is extended or adjusted under 35 U.S.C. 154(b) by 945 days.

(21) Appl. No.: 12/947,945

(22) Filed: Nov. 17, 2010

(65) Prior Publication Data
US 2011/0115169 A1 May 19, 2011

(30) Foreign Application Priority Data

Nov. 18, 2009 (JP) .................. 2009-263252

(51) Int. Cl.
*F25D 21/00* (2006.01)
*B60H 1/32* (2006.01)
*F25D 21/14* (2006.01)

(52) U.S. Cl.
USPC .............. 62/150; 62/239; 62/285; 62/289

(58) Field of Classification Search
USPC ............ 62/150, 239, 224, 225, 285, 289; 277/630, 637
See application file for complete search history.

(56) References Cited

U.S. PATENT DOCUMENTS 7,765,821 B2 * 8/2010 Araki et al. .................. 62/225

FOREIGN PATENT DOCUMENTS

| JP | 2001-113934 A | 4/2001 |
| JP | 2001-150941 A | 6/2001 |
| JP | 2002-64922 A | 2/2002 |
| JP | 2008-13127 A | 1/2008 |
| JP | 2009-67356 A | 4/2009 |

OTHER PUBLICATIONS

Notice of Allowance for Japanese Patent Application No. 2009-263252, mailed Sep. 10, 2013, with English translation.

* cited by examiner

*Primary Examiner* — Chen Wen Jiang
(74) *Attorney, Agent, or Firm* — Cantor Colburn LLP

(57) ABSTRACT

An insulator includes a step portion in a region where a sealing material support portion of a first division part comes into contact with a sealing material support portion of a second division part.

8 Claims, 4 Drawing Sheets

VEHICLE AIR CONDITIONER

BACKGROUND OF THE INVENTION

1. Field of the Invention

The present invention relates to a vehicle air conditioner.

2. Description of the Related Art

Generally, in a vehicle air conditioner, air to be supplied is cooled by an evaporator and is converted to cold air, and a heating rate of the cold air is controlled, thereby generating conditioned air.

The evaporator constitutes a part of a refrigeration cycle mounted on a vehicle and is built in the vehicle air conditioner. However, not all of the refrigeration cycles are built in the vehicle air conditioner. For example, a compressor or a condenser constituting the refrigeration cycle is installed at the outside of the vehicle air conditioner.

Since components constituting the refrigeration cycle are separately installed inside and outside the vehicle air conditioner in this manner, the vehicle air conditioner has an opening through which a part of the refrigeration cycle passes to the inside and the outside thereof.

For example, as disclosed in JP-A-2001-150941, an expansion valve which is a constituent of the refrigeration cycle is installed at the inside of the vehicle air conditioner, and the expansion valve is disposed so as to be exposed from the opening.

Incidentally, the expansion valve has a temperature lower than that of the atmospheric temperature. For this reason, water droplets are attached to the expansion valve due to condensation, and the water droplets are accumulated and fall in drops. When a large quantity of the condensation water leaks to the outside of the vehicle air conditioner, it becomes a cause of breakdown at the outside of the vehicle air conditioner. For this reason, in the vehicle air conditioner, by surrounding the expansion valve with a packing (a sealing material) formed of a foam material called an insulator and pinching the insulator by a case, the leaking of the condensation water from the opening is suppressed, and the condensation water is introduced into the case equipped with a drain mechanism.

As described above, the insulator is supported by being pinched by the case. More specifically, the case is constituted by a plurality of divided parts and is supported by being pinched by two divided parts that can be fitted to each other. In addition, upon assembling the vehicle air conditioner, by attaching the insulator around the expansion valve, fixing the insulator to one division part, and then attaching the other division part, the insulator is accommodated inside the vehicle air conditioner.

Furthermore, in order to suppress the condensation water from leaking out of a portion between an inner wall of the case and the insulator, a plate member (a sealing material support portion) for penetrating into the insulator is installed in each division part. In addition, in the vehicle air conditioner, when the divided parts are fitted to each other, the plate members installed in each division part come into contact with each other to rid a gap between the plate members, whereby the condensation water is more reliably suppressed from leaking out of the portion between the inner wall of the case and the insulator.

However, as described above, when the insulator fixed to one division part is inserted into the other division part, the plate member installed in the other division part penetrates into the insulator. For this reason, in the state in which a part of the insulator is raised (heightened) at a front end side of the plate member, and when the divided parts are fitted to each other, a part of the insulator is bitten (pinched) between the plate members. In this manner, when a part of the insulator is bitten between the plate members, a gap is farmed between the division cases or between the division case and the insulator, which leads to a condensation water leakage.

SUMMARY OF THE INVENTION

An object of an aspect according to the present invention is to prevent a part of the insulator from being bitten between the division cases that pinch the insulator therebetween in the vehicle air conditioner.

According to an aspect of the present invention, it is possible to adopt a configuration which includes a sealing material surrounding an expansion valve; and a case which is constituted by a plurality of divided parts and surrounds and pinches the sealing material by a first division part and a second division part that are two fittable divided parts, wherein the first division part and the second division part include sealing material support portions that penetrate into the sealing material and support the sealing material, and the sealing material includes a step portion in a region that comes into contact with the sealing material support portions.

In such an aspect, it is possible to adopt a configuration in which the sealing material includes a slit that sets a penetration direction of the sealing material support portions as a depth direction in the region that comes into contact with the sealing material support portions.

In such an aspect, it is possible to adopt a configuration in which the sealing material support portions are provided so as to be extended in an insertion direction when the sealing material is attached to the divided parts, and a surface of the sealing material into which the sealing material support portions penetrate and the sealing material support portions are tilted to the penetration direction side of the sealing material support portions, as they advance in the insertion direction.

In such an aspect, it is possible to adopt a configuration in which the second division part includes an opening through which the expansion valve is exposed, and an opening side sealing material support portion that is formed around the opening and penetrates into the sealing material.

In such an aspect, it is possible to adopt a configuration that includes a position regulation means which is provided in at least one of the first division part and the second division part and regulates the position of the sealing material.

In such an aspect, it is possible to adopt a configuration in which a groove portion which guides the other sealing material support portion is provided in any one of the first division part and the second division part, and an inlet region of the groove portion is formed so as to be spread out.

In such an aspect, it is possible to adopt a configuration in which the sealing material support portion of the first division part is in line-contact with the sealing material support portion of the second division part.

According to another aspect of the present invention, it is possible to adopt a configuration which includes a sealing material surrounding an expansion valve; and a case that is constituted by a plurality of divided parts and surrounds and pinches the sealing material by a first division part and a second division part which are two fittable divided parts, wherein the first division part and the second division part include sealing material support portions that penetrate into the sealing material and support the sealing material, and the sealing material includes a slit that sets a penetration direction of the sealing material support portions as a depth direction in a region where the sealing material support portion of the first division part comes into contact with the sealing material support portion of the second division part.

According to the aspect of the invention, the sealing material includes a step portion in a region where the sealing material support portion of the first division part comes into contact with the sealing material support portion of the second division part.

For this reason, even when a part of the sealing material is raised at a front end side of the sealing material support portion due to a relative movement between the first division part or the second division part and the sealing material support portion, the raised portion can be solved by reaching the step portion.

More specifically, the raised portion of the sealing material is formed due to the fact that, when a part of the sealing material is pressed by the front end of the sealing material support portion, the pressed region is sequence to a further front region and thus cannot greatly sink to a lower side, with the result that the corresponding front region escapes to an upper side without suppression. On the contrary to this, if a step portion is formed in a part of the sealing material, when a part of the sealing material is pressed by the front end of the sealing material support portion, the pressed region is divided by the further front region and the step portion, and thus can greatly sink to the lower side, with the result that the raised portion can be solved.

Since the step portion is provided in a region where the sealing material support portion of the first division part comes into contact with the sealing material support portion of the second division part, it is possible to suppress the formation of the raised portion of the sealing material in the region where the sealing material support portion of the first division part comes into contact with the sealing material support portion of the second division part. In this manner, since a squeezing portion does not exist between the first division part and the second division part due to the fact that the raised portion of the sealing material is not formed, a part of the sealing material is not bitten between the first division part and the second division part.

Thus, with the aspect according to the present invention, in the vehicle air conditioner, it is possible to prevent a part of the sealing material from being bitten between the division cases that pinch the sealing material therebetween.

DETAILED DESCRIPTION OF THE INVENTION

Hereinafter, a vehicle air conditioner in an embodiment according to the present invention will be described with reference to the drawings. In addition, in the following drawings, in order to make each member a perceivable size, the scale of each member is suitably changed.

Figure 1:
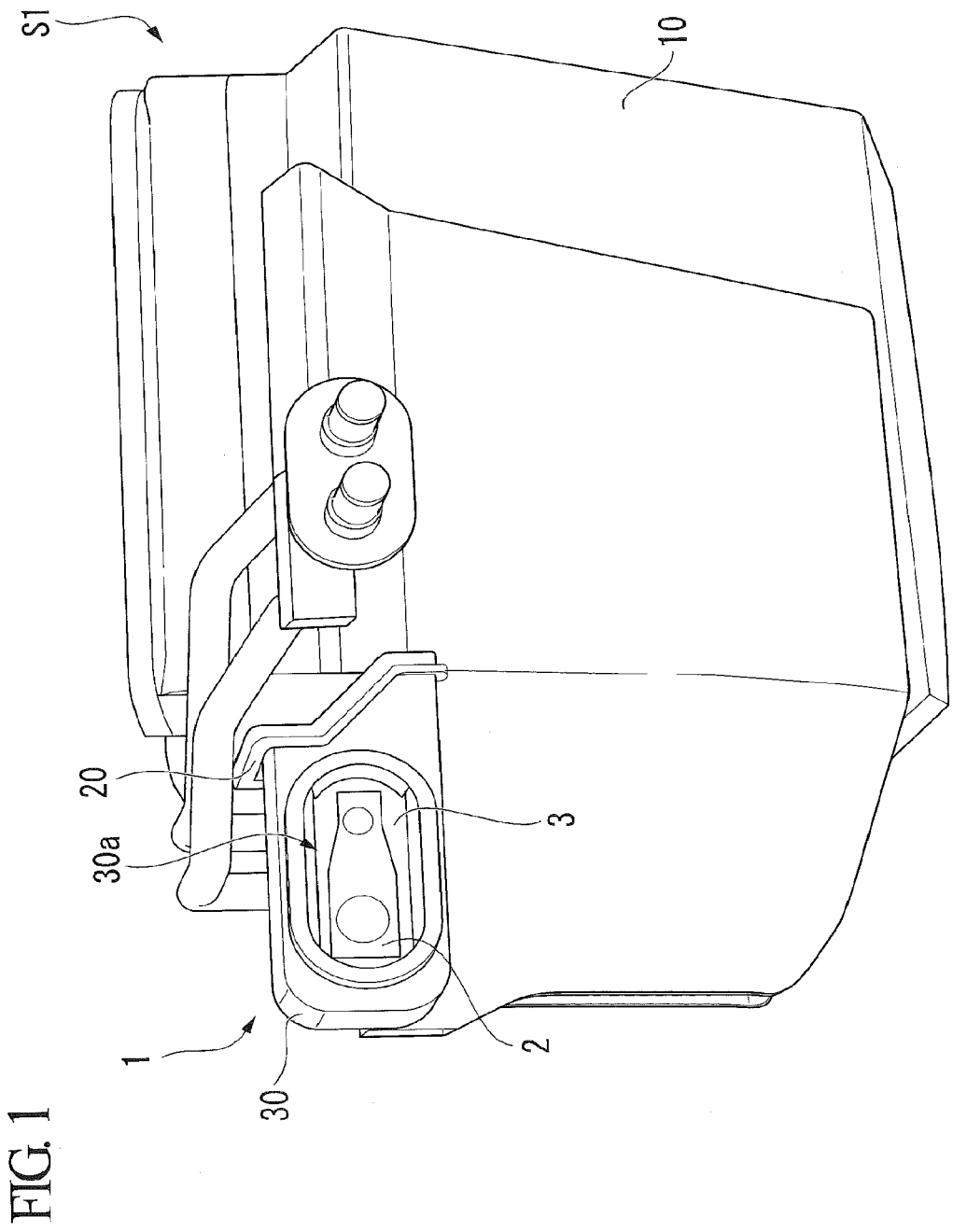
FIG. 1 is a perspective view showing a schematic configuration of a vehicle air conditioner in an embodiment of the present invention.

FIG. 1 is a perspective view that shows a schematic configuration of a vehicle air conditioner S1 of the present embodiment.

In the present embodiment, the vehicle air conditioner S1 temporarily cools the air to be supplied from a blower unit by an evaporator and controls the heating rate of the cool air thus generated, and is installed in the interior of the vehicle. In addition, as shown in FIG. 1, at the inside of the vehicle air conditioner S1 of the present embodiment, a case 1, which includes an air flow path, an evaporator, a heater core, a damper apparatus or the like, an expansion valve 2 that constitutes a part of the refrigeration cycle, and an insulator 3 (a sealing material) are included. Furthermore, since the air flow path, the evaporator, the heater core, the damper apparatus or the like are the same as the known configurations, the descriptions thereof will be omitted herein.

The case 1 includes an housing case 10 that accommodates the evaporator, the heater core, the damper apparatus or the like, an insulator holder 20 (a first division part) for fixing the insulator 3, and a duct case 30 (a second division part) forming a duct through which the air from the blower unit is conducted to the inside of the housing case 10.

In addition, as shown in FIG. 1, in the duct case 30, there is provided an opening 30a through which the inside and the outside of the vehicle air conditioner S1 are communicated with each other, and the expansion valve 2 and the insulator 3 surrounding the expansion valve 2 are disposed so as to be exposed from the opening 30a.

Moreover, the housing case 10, the insulator holder 20 and the duct case 30 are integrally configured so that the housing case 10 and the duct case 30 are fitted into each other and the insulator holder 20 is sandwiched between the housing case 10 and the duct case 30 and is fitted into each of the housing case 10 and the duct case 30.

That is, in the vehicle air conditioner S1 of the present embodiment, the case 1 is constituted by a plurality of divided parts (the housing case 10, the duct case 30, and the insulator holder 20).

Figure 2:
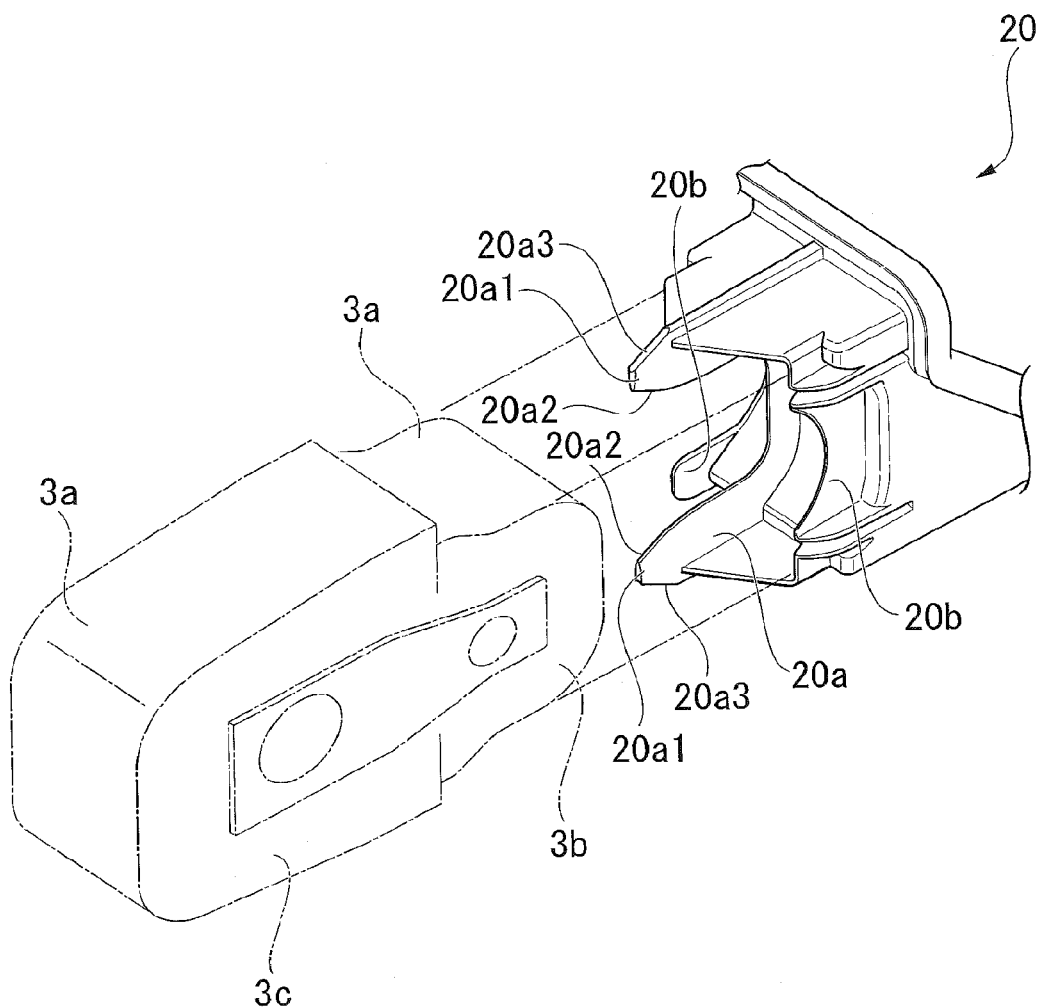
FIG. 2 is an enlarged perspective view of a part of an insulator holder that is included in the vehicle air conditioner in an embodiment of the present invention.

FIG. 2 is an enlarged perspective view of a part of the insulator holder 20. The insulator holder 20 holds an end portion of one side of the insulator 3 and is fitted into the housing case 10, and, as shown in FIG. 2, has a peripheral surface support rib 20a (a sealing material support portion) and an insulator guide 20b (a position regulation means).

The peripheral surface support rib 20a is a plate member that penetrates a peripheral surface 3a of the insulator 3 and supports the insulator 3, and is disposed so that a plate thickness direction thereof faces the opening 30a (the surface thereof faces the opening 30a). In addition, as shown in FIG. 2, the peripheral surface support rib 20a is formed in a U shape so as to penetrate from the upper surface of the peripheral surface 3a of the insulator 3 through the side surface thereof to the lower surface. Additionally, the size of the peripheral surface support rib 20a is set to adapt to the size of a region 3b (see FIG. 5) of the insulator holder 20 side of the insulator 3.

The peripheral surface support rib 20a is configured so that two front end portions 20a1 facing the duct case 30 side are sharply formed, and when the insulator 3 is attached to the insulator holder 20, the insulator 3 is smoothly moved along an inner side 20a2 of the front end portion 20a1.

Furthermore, all of an outer side 20a3 of the front end portion 20a1 becomes a region that comes into contact with a peripheral surface support rib 30b (see FIG. 3) that is included in the duct case 30. Additionally, when the insulator 3 is attached to the insulator holder 20, the outer side 20a3 of the front end portion 20a1 is set so as to be sequence to a peripheral surface 3a of a region 3c (see FIG. 5) of the insulator 3, when viewed from the thickness direction of the insulator 3.

The insulator guide 20b is a plate member that regulates the position of the insulator 3 by coming into contact with the insulator 3 from the thickness direction of the insulator 3, and is disposed to face both sides of the peripheral surface support rib 20a so that the peripheral surface support rib 20a is positioned at the center. In addition, the position of the insulator 3 is regulated by being interposed with the insulator guide 20b from both sides in the thickness direction.

Figure 3:
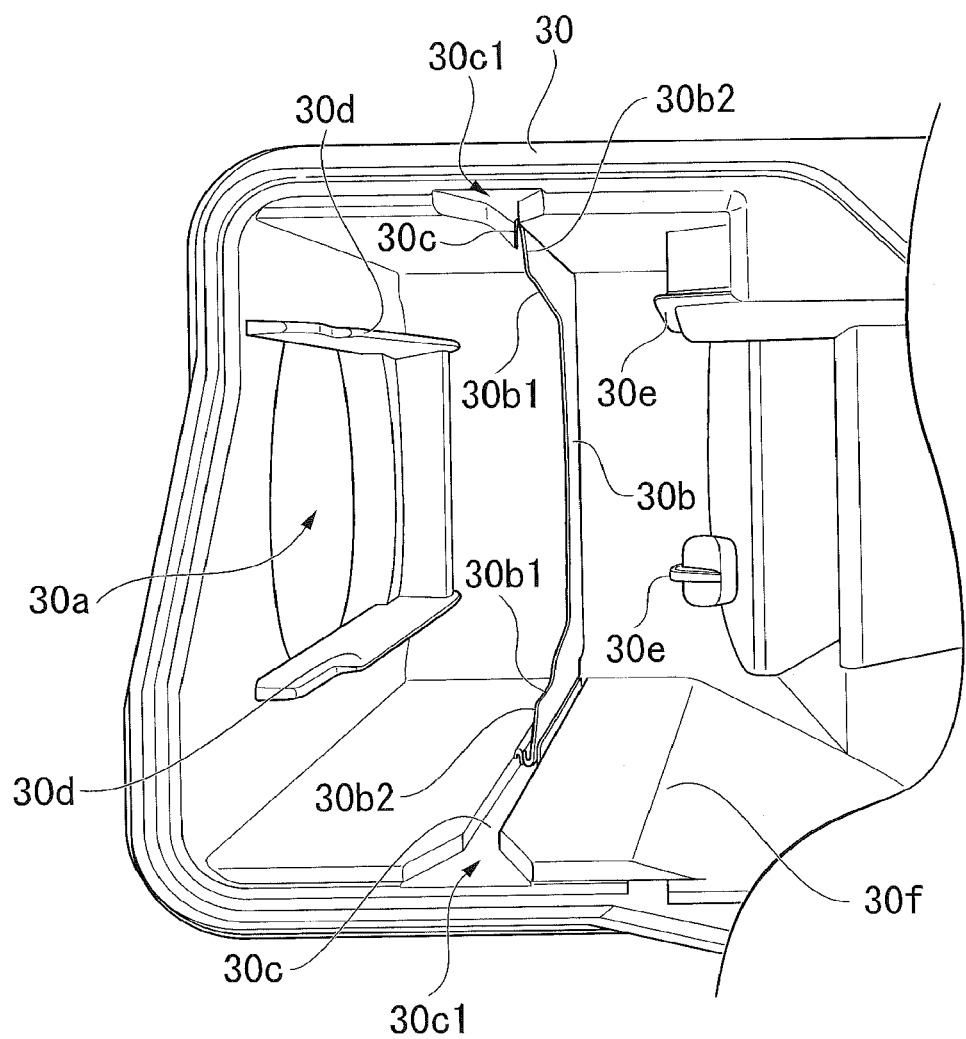
FIG. 3 is an enlarged perspective view of a region into which the insulator is inserted in a duct case that is included in the vehicle air conditioner in an embodiment of the present invention.

FIG. 3 is an enlarged perspective view of a region (namely, an inner region of the opening 30a) of the duct case 30 into which the insulator 3 is inserted. The duct case 30 includes a peripheral surface support rib 30b, a groove portion 30c, a sealing rib 30d (an opening side sealing material support portion), and an insulator pressing portion 30e (a position regulation means), in addition to the above-mentioned opening 30a.

Similar to the peripheral surface support rib 20a included in the insulator holder 20, the peripheral surface support rib 30b is a plate member that penetrates the peripheral surface 3a of the insulator 3 and supports the insulator 3, and is disposed so that the plate thickness direction thereof faces the opening 30a (the surface thereof faces the opening 30a). Furthermore, similar to the peripheral surface support rib 20a, the peripheral surface support rib 30b is also formed in the U shape so as to penetrate from the upper surface of the peripheral surface 3a of the insulator 3 through the side surface thereof to the lower surface. In addition, the size of the peripheral surface support rib 30b is set to adapt the size of the region 3c (see FIG. 5) of the insulator 3.

The peripheral surface support rib 30b is provided so as to be extended in an insertion direction upon attaching the insulator 3 to the duct case 30 and is tilted so that the distance between the inner sides 30b1 of the peripheral surface support rib 30b becomes shorter as it advances in the insertion direction (a paper depth direction in FIG. 3) of the insulator 3.

Furthermore, a front end portion 30b2 of the peripheral surface support rib 30b is tilted to adjust an outer side 20a3 so that it can come into contact with the overall outer side 20a3 of the front end portion 20a1 of the peripheral surface support rib 20a included in the insulator holder 20.

Figure 4:
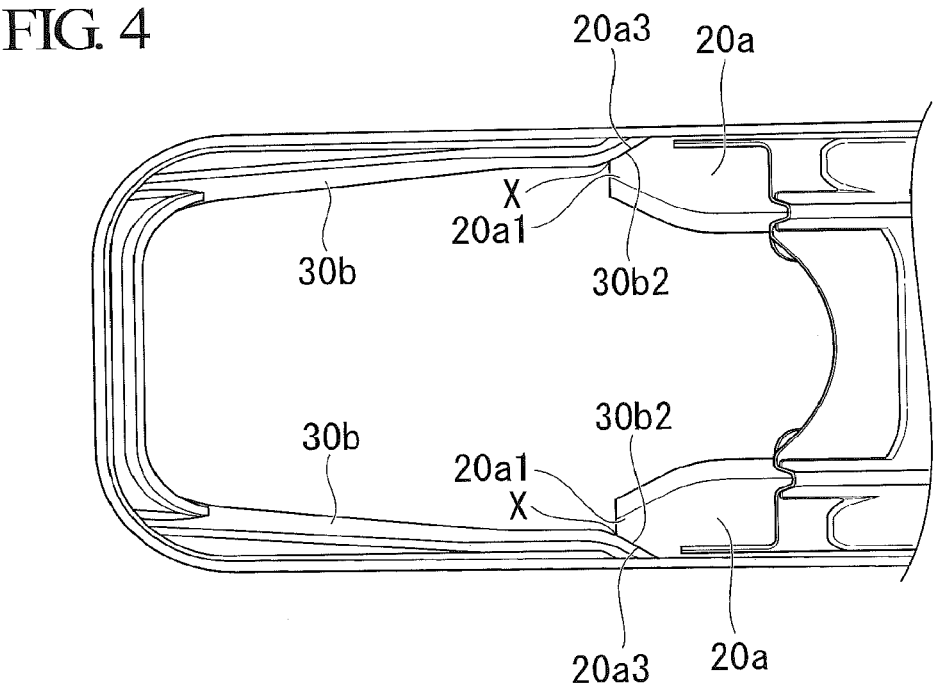
FIG. 4 is a cross-sectional view showing a figure in which an insulator holder and a duct case, which are included in the vehicle air conditioner in an embodiment of the present invention, are fitted to each other.

FIG. 4 is a cross-sectional view showing a figure in which the insulator holder 20 and the duct case 30 are fitted into each other. When the insulator holder 20 and the duct case 30 are fitted into each other, the front end portion 30b2 of the peripheral surface support rib 30b of the duct case 30 comes into line-contact with the whole outer side 20a3 of the front end portion 20a1 of the peripheral surface support rib 20a included in the insulator holder 20. As a result, when viewed from the opening 30a side, the peripheral surface support rib becomes a circular shape (a closed curve shape). That is, the insulator holder 20 and the duct case 30 are fitted into each other, whereby the insulator 3 is supported in a state where the peripheral surface support rib penetrates the entire circumference thereof.

Returning to FIG. 3, the groove portion 30c induces the peripheral surface support rib 20a of the insulator holder 20 until contact is made with the peripheral surface support rib 30b, and an inlet region 30c1 is formed so as to be spread out (a fan shape). In addition, the groove portions 30c are formed at both of a ceiling portion and a floor portion of a region of the insulator holder 20 in which the insulator 3 is accommodated.

A sealing rib 30d is formed around the opening 30a and is a plate member that penetrates in a thickness direction of the insulator 3. The sealing rib 30d is to stop the progression of the condensation water (and air) facing the opening 30a just next to the opening 30a.

The insulator pressing portion 30e (a position regulation means) is a plate member that regulates the position of the insulator 3 by coming into contact with the insulator 3 from the thickness direction of the insulator 3, and comes into contact with a surface opposite to the surface of the opening 30a side of the insulator 3.

In addition, in the duct case 30, a part 30f of the floor portion in a region in which the insulator 3 is accommodated is formed so as to fall off (decline) toward the lower portion of the case 1 including the drain mechanism. In addition, the condensation water dropped from the insulator 3 flows to the lower portion of the case 1 including the drain mechanism along a part 30f of the floor portion and is drained. Moreover, the height of the floor portion is set so that, even when the vehicle air conditioner S1 is tilted by the slope of the vehicle in a pre-assumed range, the floor portion does not become higher than the opening 30a.

Figure 5:
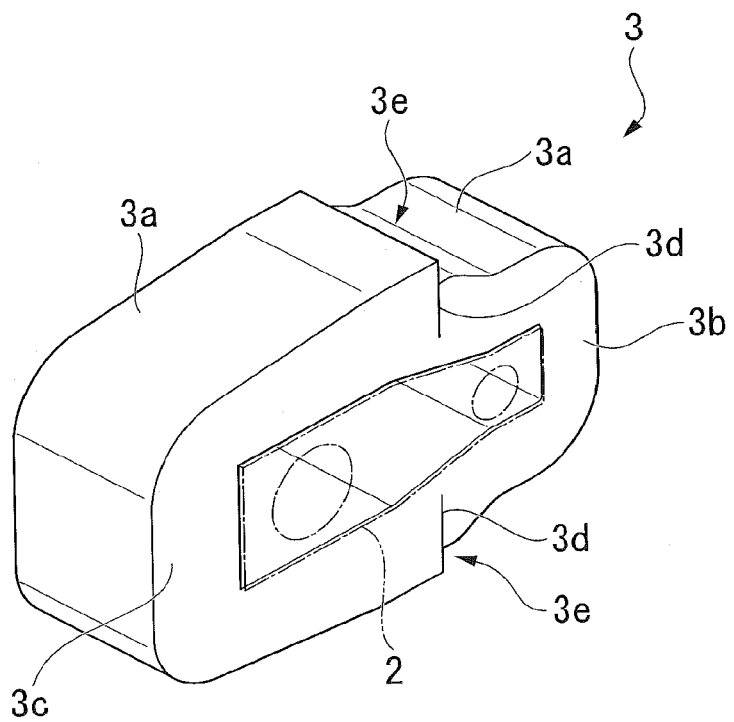
FIG. 5 is a perspective view of the insulator that is included in the vehicle air conditioner in an embodiment of the present invention.

FIG. 5 is a perspective view of the insulator 3. The insulator 3 is attached in a state in which the surface of the opening 30a side of the expansion valve 2 and the opposite surface are exposed, and is supported by being interposed with (surrounded around) the insulator holder 20 and the duct case 30. In the insulator 3, on the peripheral surface 3a, there are formed a slit 3d and a step portion 3e that start from a place coming into contact with a region (a place shown by X in FIG. 4) where the peripheral surface support rib 20a of the insulator holder 20 are in contact with the peripheral surface support rib 30b of the duct case 30. The slit 3d sets the penetration direction (a direction facing the expansion valve 2) of the peripheral surface support ribs 20a and 30b as the depth direction, is extended in a direction perpendicular to the extension direction of the peripheral surface support ribs 20a and 30b, and is formed all over the regions in the thickness direction of the insulator 3.

Upon setting one side (e.g., the insulator holder 20 side) of the insulator 3 as a region 3b and the other side (e.g., the duct case side 30 side) thereof as a region 3c across from the slit 3d, there is formed a step portion 3e in which the peripheral surface 3a of the region 3b is set to be lower (deeper) than the peripheral surface 3a of the region 3c in regard to the depth direction of the slit 3d. The step portion 3e has a surface (a wall surface) formed so as to extend in the depth direction of the slit 3d and in the thickness direction of the insulator 3 in the peripheral surface 3a. In the insulator 3, the wall surface of the step portion 3e is sequence to a surface in the slit 3d. Furthermore, the step portion 3e is formed starting from a position shallower than the deepest portion of the slit 3d. Moreover, the height (depth) of the step portion 3e is set to be smaller than the depth of the slit 3d.

The region 3c of the duct case 30 side is formed to be greater than the region 3b of the insulator holder 20 side. The region 3b is supported by the insulator holder 20 and the region 3c is supported by the duct case 30.

Furthermore, in the insulator 3, the peripheral surface 3a of the region 3c of the duct case 30 side is tilted along the tilted peripheral surface support rib 30b of the duct case 30. That is, the upper and lower peripheral surfaces 3a of the region 3c of the duct case 30 side are tilted so that the gap therebetween is enlarged so as to be spread out as they advance the region 3b of the insulator holder 20 side.

As described above, the vehicle air conditioner S1 of the present embodiment is operated to cool the air, which is to be supplied, using an evaporator, thus generating cool air, and, by adjusting the heating rate of the cool air, generates conditioned air and supplies the conditioned air to the vehicle interior.

At this time, condensation is caused by the cooling of the expansion valve 2 and the condensation water is adhered to the expansion valve 2, but most of the condensation water is blocked by the insulator 3, the peripheral surface support ribs 20*a* and 30*h*, and the sealing rib 30*d*, and is prevented from leaking out of the opening 30*a*, and is drained from a drain mechanism disposed at the lower portion of the case 1 along the floor portion.

In the vehicle air conditioner S1 of the present embodiment, after the insulator 3 is attached to the insulator holder 20, the insulator 3 is inserted into the duct case 30, whereby the duct case 30 and the insulator holder 20 are fitted into each other.

Herein, in the vehicle air conditioner S1 of the present embodiment, the insulator 3 includes a step portion 3*e* at a region X where the peripheral surface support rib 20*a* of the insulator holder 20 comes into contact with the peripheral surface support rib 30*b* of the duct case 30 in the peripheral surface 3*a*.

For this reason, even when a part of the insulator 3 is raised at the front end side of the peripheral surface support rib 30*b* due to the relative movement of the peripheral surface support rib 30*b* of the duct case 30 relative to the insulator 3, the raised portion is solved by reaching the step portion 3*e*.

More specifically, the raised portion in the peripheral surface 3*a* of the insulator 3 generated upon attaching the duct case 30 occurs due to the fact that, when the peripheral surface of the insulator is pressed by the front end portion 30*b*2 of the peripheral surface support rib 30*b*, the pressed region is sequence to the further front region and thus cannot greatly sink to the lower side, with the result that the region in front of the front end portion 30*b*2 escapes to the upper part without suppression. On the contrary, if the step portion 3*e* is formed in a part of the insulator 3, when a part of the peripheral surface 3*a* of the insulator 3 is pressed by the front end portion 30*b*2 of the peripheral surface support rib 30*b*, the pressed region is divided by the further front region and the step portion 3*e* and thus can greatly sink to the lower side, with the result that the raised portion can be solved.

That is to say, if the peripheral surface 3*a* pressed by the front end portion 30*b*2 of the peripheral surface support rib 30*b* due to the movement of the duct case 30 is sequence to the further front peripheral surface 3*a* in the movement direction of the duct case 30, the peripheral surface 3*a* in front of the front end portion 30*b*2 cannot greatly sink to the lower side (cannot be dented/depressed in the penetration direction). As a result, the peripheral surface 3*a* in front of the front end portion 30*b*2 escapes (protrudes in an opposite direction of the penetration direction) to the upper part without suppression and the raised portion is formed.

On the contrary, in the vehicle air conditioner S1 of the present embodiment, the peripheral surface 3*a* pressed by the front end portion 30*b*2 of the peripheral surface support rib 30*b* is not sequence to the further front peripheral surface 3*a* in the movement direction of the duct case 30 (divided by the step portion 3*e*), and thus can greatly sink to the lower side. As a result, the peripheral surface 3*a* in front of the front end portion 30*b*2 is suppressed from escaping to the upper part, whereby the formation of the raised portion can be suppressed.

In the vehicle air conditioner S1 of the present embodiment, the step portion 3*e* is provided in the region X where the peripheral surface support rib 20*a* of the insulator holder 20 comes into contact with the peripheral surface support rib 3013 of the duct case 30 in the peripheral surface 3*a*. For this reason, it is possible to suppress the formation of the raised portion of the insulator 3 in the region where the peripheral surface support rib 20*a* comes into contact with the peripheral surface support rib 30*b*. In this manner, due to the fact that the raised portion of the insulator is not formed, a squeezing portion does not exist between the insulator holder 20 and the duct case 30, and thus, a part of the insulator 3 is not bitten between the insulator holder 20 and the duct case 30.

Thus, according to the vehicle air conditioner S1 of the present embodiment, it is possible to prevent a part of the insulator 3 from being bitten between the division cases (the insulator holder 20 and the duct case 30) that pinch the insulator 3 therebetween.

In the vehicle air conditioner S1 of the present embodiment, the insulator 3 has the slit 3*d* in the region X where the peripheral surface support rib 20*a* of the insulator holder 20 comes into contact with the peripheral surface support rib 30*b* of the duct case 30 in the peripheral surface 3*a*. For this reason, a sliding movement area between the region 3*c* of the duct case 30 side and the region 3*b* of the insulator holder 20 side decreases, whereby the peripheral surface 3*a* in front of the peripheral surface 3*a* pressed by the front end portion 30*b*2 more easily sinks to the lower side. A part of the stress within the insulator 3 generated at the time of assembling the insulator holder 20, the insulator 3 and the duct case 30 is opened by the slit 3*d*. As a consequence, the raised portion of the peripheral surface 3*a* of the insulator 3 can be further solved.

In the vehicle air conditioner S1 of the present embodiment, the peripheral surface support rib 30*b* and the peripheral surface 3*a* in the region 3*c* of the duct case side of the insulator 3 are tilted by the insulator 3 so that the peripheral surface support rib 30*b* more penetrates as they progress in the insertion direction of the insulator 3. For this reason, when the insulator 3 is inserted into the duct case 30, a penetration amount (a penetration region area/a penetration depth) of the peripheral surface support rib 30*b* into the insulator 3 until just before the insulator holder 20 is fitted to the duct case 30 decreases, whereby the insulator 3 can be smoothly inserted into the duct case 30.

Furthermore, in the vehicle air conditioner S1 of the present embodiment, the sealing rib 30*d*, which is formed around the opening 30*a* and penetrates the insulator 3, is included. For this reason, it is possible to prevent the condensation water from reaching the opening 30*a* by the sealing rib 30*d*.

Moreover, in the vehicle air conditioner S1 of the present embodiment, the insulator guide 20*b* that regulates the position of the insulator 3 and the insulator pressing portion 30*e* are included. For this reason, when the insulator 3 is inserted into the duct case 30, it is possible to suppress the insulator 3 from deviating from a predetermined position.

Additionally, in the vehicle air conditioner S1 of the present embodiment, the groove portion 30*c* that guides the peripheral surface support rib 20*a* is included, and the inlet region 30*e*1 of the groove portion 30*c* is formed so as to spread out. For this reason, the peripheral surface support rib 20*a* can be reliably guided and can be easily inserted into the groove portion 30*c*.

Furthermore, in the vehicle air conditioner S1 of the present embodiment, the front end portion 30*b*2 of the peripheral surface support rib 30*b* of the duct case 30 and the outer side 20*a*3 of the front end portion 20*a*1 of the peripheral surface support rib 20*a* included in the insulator holder 20 are in line-contact with each other when viewed from the opening 30a side. For this reason, it is possible to suppress the condensation water from leaking out of the portion between the peripheral surface support rib 30b of the duct case 30 and the peripheral surface support rib 20a included in the insulator holder 20.

An embodiment according to the present invention has been described with reference to the drawings, but the present invention is not limited to the above-mentioned embodiment. All shapes, all organizations or the like of each constituent described in the above-mentioned embodiment are examples, and various modifications can be made based on the design requirements or the like without departing from the main gist of the present invention.

For example, in the above-mentioned embodiment, the description has been given of the configuration in which the case 1 includes the housing case 10, the insulator holder 20, and the duct case 30.

However, the present invention is not limited thereto, for example, the insulator holder 20 may be integrated with the housing case 10.

Additionally, in the above-mentioned embodiment, as shown in FIG. 5, the insulator in which the slit 3d is provided at the position where the step portion 3e is formed has been described.

However, the present invention is not limited thereto, but an insulator in which only the step portion 3e or only the slit 3d is formed may be adopted.

While some embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle air conditioner comprising:
a sealing material surrounding an expansion valve; and
a case which is constituted by a plurality of divided parts and surrounds and pinches the sealing material by a first division part and a second division part that are two fittable divided parts,
wherein the first division part and the second division part include sealing material support portions that penetrate the sealing material and support the sealing material, and
wherein the sealing material includes a step portion in a region that comes into contact with the sealing material support portions.

2. The vehicle air conditioner according to claim 1,
wherein the sealing material includes a slit that sets a penetration direction of the sealing material support portions as a depth direction in the region that comes into contact with the sealing material support portions.

3. The vehicle air conditioner according to claim 1,
wherein the sealing material support portions are provided so as to be extended in an insertion direction when the sealing material is attached to the divided parts, and a surface of the sealing material into which the sealing material support portions penetrate and the sealing material support portions are tilted to the penetration direction side of the sealing material support portions, as the surface and the sealing material support portions advance in the insertion direction.

4. The vehicle air conditioner according to claim 1,
wherein the second division part includes an opening through which the expansion valve is exposed, and an opening side sealing material support portion that is formed around the opening and penetrates into the sealing material.

5. The vehicle air conditioner according to claim 1, further comprising:
a position regulation means which is provided in at least one of the first division part and the second division part and regulates the position of the sealing material.

6. The vehicle air conditioner according to claim 1,
wherein a groove portion that guides the other sealing material support portion is provided in any one of the first division part and the second division part, and an inlet region of the groove portion is formed so as to be spread out.

7. The vehicle air conditioner according to claim 1,
wherein the sealing material support portion of the first division part is in line-contact with the sealing material support portion of the second division part.

8. A vehicle air conditioner comprising:
a sealing material surrounding an expansion valve; and
a case that is constituted by a plurality of divided parts and surrounds and pinches the sealing material by a first division part and a second division part which are two fittable divided parts,
wherein the first division part and the second division part include sealing material support portions that penetrate into the sealing material and support the sealing material, and
wherein the sealing material includes a slit that sets a penetration direction of the sealing material support portions as a depth direction in a region where the sealing material support portion of the first division part comes into contact with the sealing material support portion of the second division part.

* * * * *